3,740,254
METHOD OF VACUUM METALLIZING THERMO-
PLASTIC POLYMERIC FILM AND RESULTING
PRODUCT
Robert Clive Lansbury, Harpenden, and David Mann, St.
 Albans, England, assignors to Imperial Chemical Indus-
 tries Limited, London, England
No Drawing. Filed Apr. 9, 1971, Ser. No. 132,906
Claims priority, application Great Britain, Apr. 29, 1970,
20,657/70
Int. Cl. B32b 27/06; B44d 1/14
U.S. Cl. 117—71 R                                7 Claims

ABSTRACT OF THE DISCLOSURE

Using resins containing an isocyanate-ended polyure-
thane of average moleculer weight more than 1000 and
an organic polyisocyanate containing an average of more
than two isocyanurate groups per molecule as primer
coatings for metallizing thermoplastic films.

---

This invention relates to the production of metallized
films, to improved metalized films, and in particular to
metallized films of crystalline polyesters and polyolefins.

According to the present invention we provide a proc-
ess for the production of a metallized organic thermo-
plastic polymeric film by coating at least one surface of
a film with a resin which contains an isocyanate-ended
polyuprethane of average molecular weight greater than
1000 and an organic polyisocyanate containing isocyanu-
rate rings and having an average of more than two isocy-
anate groups per molecule, drying the coating on the film,
and depositing a layer of metal on the coated surface of
the film.

The isocyanate-ended polyurethane used in the process
of the present invention should be cured on the film so
that it will become adhesively bonded to both the film
and the metal layer. These polyurethanes may be cured
by heating after they have been applied to the film, and
this may be effected before, during or after the deposi-
tion of the layer of metal.

For certain films, particularly polyolefin films, we pre-
fer that the surface of the film is subjected to a treatment
to improve its bonding properties before the coating of
the isocyanate-ended polyurethane is applied. This treat-
ment may be a physical or a chemical treatment which
oxidizes the film surface and thus improves its bonding
properties. Examples of suitable chemical treatments are
to treat the surface of the film with oxidizing agents such
as chromic acid in sulphuric acid, or hot nitric acid,
or to expose the surface to ozone. Alternatively, the sur-
face of the film may be subjected to exposure to corona
discharge (such treatment is described in British specifi-
cation No. 715,914), to ionizing radiation, or to a flame
for a sufficient time to cause superficial oxidation but not
long enough to cause distortion of its surface. The pre-
ferred treatment, because of its effectiveness and sim-
plicity, is a high voltage electric stress accompanied by
corona discharge. The treated surface of the film is then
over-coated with the resin. The preparation of the resins
which are coated onto the surface treated film in the
process of the present invention is described in our British
Pat. No. 1,052,042.

The isocyanate-ended polyurethanes of molecular
weight more than 1000 may be obtained by interaction
of a molecular excess of an organic polyisocyanate with
a polyhydroxy compound of molecular weight greater
than 400, and preferably between 400 and 5,000, option-
ally in conjunction with a hydroxy compound of molecu-
lar weight below 400.

Examples of polyhydroxy compounds of molecular
weight greater than 400, are polyethers, polyetherthio-
ethers, polyesters and polyacetals. These polymers should
preferably be linear or only slightly branched. Examples
of suitable polyethers are polymers and copolymers of
cyclic oxides, for example 1:2-alkylene oxides such as
ethylene oxide, epichlorohydrin, 1:2-propylene oxide, 1:2-
butylene oxide and 2:3-butylene oxide, oxycyclobutane
and substituted oxycyclobutanes, and tetrahydrofuran.
Alternatively, polyethers such as are prepared, for exam-
ple, by the polymerization of an alkylene oxide in the
presence of a basic catalyst and water, glycol, a poly-
hydric alcohol such as a glycerol, or a primary mono-
amine or mixtures of such polyethers may be used. The
preferred polyethers are polypropylene ether polymers
which have an equivalent weight per hydroxyl group of
between 200 and 1500.

If a polyester is used it may be made by conventional
means from for example dicarboxylic acids and dihydric
alcohols. Suitable dicarboxylic acids are succinic, glutaric,
adipic, pimelic, suberic, azelaic, sebacic, phthalic, iso-
phthalic, and terephthalic acids and mixtures of these.
Small proportions of polycarboxylic acids such as trimesic
acid may also be used. Suitable glycols are ethylene glycol,
1:2-propylene glycol, diethylene glycol, dipropylene glycol,
trimethylene glycol, 1:2-, 1:3-, 2:3- and 1:4-butylene gly-
cols, neopentyl glycol, pentamethylene glycol, and hexa-
methylene glycol and mixtures of these. The preferred
polyesters have melting points below 60° C. and are de-
rived from glycols having from two to eight carbon atoms
and dicarboxylic acids having from four to ten carbon
atoms. Particularly suitable are polyesters of molecular
weight between 500 and 2500 derived from such dicarbox-
ylic acids, especially adipic acid, and a glycol or mixture
of glycols at least one of which contains at least one sec-
ondary hydroxyl group.

The hydroxy compound of molecular weight below 400
which may optionally be condensed with the polyiso-
cyanate in conjunction with the polyhydroxy compound
may be a mono functional alcohol such as methanol,
ethanol or butanol, or a glycol such as ethylene glycol,
diethylene glycol, butylene - 1:3 - glycol, trimethylene
glycol, tetramethylene glycol, propylene glycol, dipro-
pylene glycol, neopentyl glycol and thiodiglycol, or a
poyol such as glycerol, trimethylolethane, tirmethylolpro-
pane, hexanetriol, pentaerythritol, sorbitol or mannitol.

The organic polyisocyante which is interacted with
the hydroxy compound of molecular weight greater than
400 to prepare the isocyanate-ended polyurethane may
be for example an aliphatic or cycloaliphatic diisocyanate.
Alternatively, it may be a polyurethane polyisocyanate
obtained by interaction of excess of a polyisocyanate, such
as those hereinbefore described, with a polyhydroxy com-
pound such as ethylene glycol, butylene glycol, diethylene
glycol, neopentyl glycol, trimethylolpropane, glycerol or
hexanetriol. If desired the polyisocyanate may be polym-
erized to afford polyisocyanates containing isocyanurate
rings.

The preparation of the isocyanate-ended polyurethane
is carried out in conventional manner usually by heating
the ingredients together at a temperature between 40° C.
and 160° C. and preferably between 70° C. and 130°
C. The reaction may be carried out in a solvent inert to
isocyanates, particularly suitable solvents being esters,
ketones and halogenated hydrocarbons. It is usually pre-
ferred that the reaction is carried out under slightly
acidic conditions to minimize side reactions leading to
high viscosity products. Although polyisocyanates are usu-
ally acidic, it may be necessary, in order to ensure acidity
of the reaction mixture, to add an acidic compound such
as a mineral or organic acid or acid halide in amount equiv-
alent to 0.005% calculated as halide on the weight of polyisocyanate present. In order to ensure that the polyurethane possesses terminal isocyanate groups the amount of polyisocyanate used in its preparation should be such that there is an excess of isocyanate groups over that required to react with the hydroxyl groups present.

Particularly useful isocyanate-ended polyurethanes are obtained from organic polyisocyanates and polyesters or mixtures of polyesters with a hydroxy compound of low molecular weight wherein the polyester or mixture possesses an average of not more than three hydroxy groups per molecule, and the organic polyisocyanate is a diisocyanate used in such amount that there are from 1.05 to 2.0 and preferably from 1.2 to 1.5 isocyanate group for each hydroxyl group.

The organic polyisocyanates containing isocyanurate rings used in our invention may be prepared by the polymerization of polyisocyanates in the presence of the catalysts known to assist this polymerization. For example a diisocyanate either alone or in a suitable inert solvent may be heated with a basic catalyst such as an aliphatic tertiary amine, a basic metallic compound such as an alkali or alkaline earth metal oxide, hydroxide, carbonate, alcoholate or phenate, an alkali metal derivative of an enolisable compound or a metallic salt of a weak organic acid. Co-catalysts may be used, such as alcohols, phenols, mono-N-substituted carbamic esters or cyclic oxides.

The organic polyisocyanate containing isocyanurate rings may be derived from an aliphatic or cycloaliphatic diisocyanate such as may be used in preparing the isocyanate-ended polyurethane.

The resins which are coated onto the film in the process of our invention may be obtained by blending the ingredients together in any order. The relative proportions of isocyanate-ended polyurethane and isocyanurate polyisocyanates are preferably within the range from 12:1 to 1:12 by weight, but proportions outside this range may be used if desired.

Our preferred resins are those prepared by reaction of polyethylene propylene adipate with tolylene diisocyanate in a suitable solvent, and then reacting the product of this reaction with an equal amount by weight of an organic polyisocyanate containing isocyanurate rings dissolved in a suitable solvent.

The coating resin used in the process of this invention may be modified by blending with other suitable materials. For example, the water resistance of the coated film may be improved if the resin is blended with another thermosetting resin, e.g. melamine formaldehyde or a urea formaldehyde or epoxy condensation resin. The processability may be improved if the resin is blended with a small amount of a polyol. Alternatively the coating resin may be blended with an acrylic resin such as those described in our British Pat. No. 1,134,876.

The resin may be applied to one or both surfaces of the film and may be applied as a dispersion or as a solution. The dispersant or solvent in which the resin is applied to the film should be chosen so that it does not react with isocyanates. Examples of suitable organic solvents include aromatic hydrocarbon solvents such as xylene, urethane grades of esters and ketones such as ethyl acetate, ethoxyethyl acetate, butoxyethyl acetate, methylethylketone, methyliso butylketone, or methoxyhexanone, or mixtures of such solvents as is appropriate.

After the coating of the resin has been applied to the treated surface or surfaces of the film it should be dried off on the film before the metal layer is deposited. The resin is at least partially cured during the drying operation so that it adheres to the base film and will not be removed by the application of the metal layer. The process of this invention is particularly applicable to applying metal coatings to oriented films and as oriented films tend to be dimensionally unstable at elevated temperatures it is desirable that the time to which the film is subjected to elevated temperatures during the process of the present invention be as short as possible. Similarly it is desirable that the temperatures to which the film is subjected should be as low as possible consistent with satisfactory adhesion of the metal layer to the film. We prefer that the resin be dried off on the film at a temperature in the range of 60° C. to 120° C., preferably 60° C. to 90° C.

When the coating of the resin has been dried off on the film the metal layer may then be deposited on the film.

Methods are well known for the application of metal layers to films and any of these methods may be used. Our preferred method consists of directing a stream of metal vapour onto the surface of the film by vacuum evaporation techniques. In these techniques the metal is heated in a high vacuum typically in the range $10^{-3}$ to $10^{-5}$ torr, to a temperature which exceeds its melting point such that the vapour pressure of the metal is greater than approximately $10^{-2}$ torr. Under these conditions the metal vaporizes emitting molecular rays in all directions. These molecular rays impinge upon the substrate, condense and so form a thin metallic film over the substrate.

The process of the present invention is applicable to the deposition of all metal coatings on to thermoplastic films and is particularly applicable to the deposition of zinc, aluminum, copper, chromium, nickel, silver and gold.

The present invention is also concerned with metallized films produced by the process of the present invention and therefore provides an organic thermoplastic film coated with a metal layer, said metallized film being provided with an intermediate resin coating between the film and the metal layer which comprises an isocyanate-ended polyurethane of average molecular weight greater than 1000 and an organic polyisocyanate containing isocyanurate rings and having average of more than two isocyanate groups per molecule.

The process and product of the present invention relate to films of any organic thermoplastic polymeric material, for example polymers and copolymers of alpha olefins such as ethylene, propylene, butene and 4-methyl pentene-1, linear polyesters such as polyethylene terephthalate and polyethylene-1:2-diphenoxyethane-4,4'-dicarboxylate, and polymers and copolymers containing vinyl chloride. The films which are metallized by this invention may be unoriented or may be oriented in one or both of two mutually perpendicular directions in the plane of the film and if oriented in both directions the orientation may be equal in those directions or unequal, for example with the higher degree of orientation in a preferred direction (usually the longitudinal direction). The oriented films may be heat set either before or after the coating treatment, and the resin coating may be applied before or after the film is stretched to orient it.

Although we prefer that the resin coating be applied to an uncoated film substrate, the substrate may be, if desired, a composite substrate, such as polypropylene film to which has been applied a coating layer of polyvinylidene chloride.

Our invention is particularly applicable to oriented films of polypropylene and polyethylene terephthalate and the metallized films are useful for the manufacture of capacitors or may be slit to produce decorative textile yarns. Textile yarns, may be produced by slitting a film along its length and it is important that these yarns have high strength along the axis of the yarn and thus films with a higher degree of orientation along their length are preferred for the production of yarns.

The invention is illustrated by reference to the following examples.

EXAMPLE 1

By means of a roller coating system a biaxially oriented polypropylene film containing conventional antistatic and antiblocking additives totalling about 1.4% by weight was coated with a 5% by weight solution in methylethylketone of a mixture of an isocyanate-ended, polyester-based urethane prepolymer and a polyisocyanate containing isocyanurate rings—commercially available as "Daltosec" 1450 ("Daltosec" is a Registered Trademark of Imperial Chemical Industries Limited). The average weight of coating deposited on the film surface was abot 0.25 g./m.²

The coated film surface was cured by drying in a circulating-air oven at 90° C. for about 30 seconds, and a layer of aluminum was then deposited on the cured surface by a conventional vacuum metallized technique.

To test the adhesion of the aluminum layer to the coated substrate, a 25 mm. wide strip of "Sellotape" 1109 adhesive tape ("Sellotape" is a Trademark) was pressed into contact with the aluminum coated surface, and then pulled sharply away from the subtrate. By visual inspection of the adhesive tape it was apparent that virtually none of the aluminum coating layer had been removed from the substrate.

By comparison, when an identical polypropylene film was directly metallized with aluminum, without the application of an intermediate resin coating, about 90% of the aluminum was removed by the adhesive tape test.

EXAMPLE 2

The procedure of Example 1 was repeated, using as substrate a biaxially oriented polypropylene film containing no antistatic or other additives.

When submitted to the adhesive tape test described in Example 1, approximately 50% of the aluminum coating was removed, whereas in a comparative test in which the aluminum was deposited directly onto a polypropylene substrate, approximately 90% of the aluminum layer was removed by the adhesive tape.

EXAMPLE 3

The procedure of Example 2 was repeated, but in this example the substrate was metallized with silver by a conventional vacuum deposition technique.

When tested by the adhesive tape method outlined in Example 1, approximately 50% of the silver layer was removed, whereas about 95% of the silver layer was removed from a similiar substrate which had not been primed with an intermediate resin coating.

EXAMPLE 4

A biaxially oriented polypropylene film, free from additives, was coated with a methylethylketone solution containing 5% by weight of "Daltosec" 1450 ("Daltosec" is a Registered Trademark) and 0.1% by weight of a beta diethylamino ethanol catalyst—available as "Daltogen" 50 ("Daltogen" is a Registered Trademark of Imperial Chemical Industries Limited). The average weight of the coating deposited on the film surface was about 0.25 g./m.²

After curing in an air oven at 60° C. for 30 seconds, a layer of aluminum was deposited on the coated substrate by a conventional vacuum metallizing technique.

When tested by the adhesive tape test outlined in Example 1, approximately 50% of the aluminum layer was removed, whereas in a comparative test using an unprimed substrate approximately 90% of the aluminum layer was removed.

EXAMPLE 5

The procedure of Example 4 was repeated using silver in place of aluminum.

When tested by the technique outlined in Example 1 approximately 50% of the silver was removed from the substrate, whereas in a comparative test on an unprimed substrate approximately 95% of the silver layer was removed.

We claim:

1. A biaxially oriented metallized film comprising a film, selected from the group consisting of polypropylene and polyethylene terephthalate films, coated with a vacuum evaporated metal layer, said metallized film being provided with an intermediate resin coating between the film and the metal layer which coating comprises (a) an isocyanate-ended polyurethane of average molecular weight greater than 1000 derived from an organic polyisocyanate and a polyhydroxy compound having a molecular weight greater than 400 in such amounts that there are from 1.05 to 2.0 isocyanate groups for each hydroxyl group present and (b) an organic polyisocyanate containing isocyanurate rings and having an average of more than two isocyanate groups per molecule, the relative proportions by weight of isocyanate-ended polyurethane and organic polyisocyanate containing isocyanurate rings being within the range 12:1 to 1:12.

2. A metallized film according to claim 1 in which the organic polyisocyanate is selected from the group consisting of an aliphatic, a cycloaliphatic and an aromatic polyisocyanate.

3. A metallized film according to claim 1 in which the polyisocyanate is a diisocyanate.

4. A metallized film according to claim 1 in which the polyisocyanate containing isocyanurate rings is selected from the group consisting of an aliphatic, a cycloaliphatic and an aromatic polyisocyanate.

5. A metallized film according to claim 1, metallized with a metal selected from the group consisting of zinc, aluminum, copper, chromium, nickel, silver and gold.

6. A process for producing a metallized organic thermoplastic polymeric film which comprises coating at least one surface of a biaxially oriented film, selected from the group consisting of polypropylene and polyethylene terephthalate films, with a solution or dispersion of a resin which contains (a) an isocyanate-ended polyurethane of average molecular weight greater than 1000 derived from an organic polyisocyanate and a polyhydroxy compound having a molecular weight greater than 400 in such amounts that there are from 1.05 to 2.0 isocyanate groups for each hydroxyl group present, and (b) an organic polyisocyanate containing isocyanurate rings and having an average of more than two isocyanate groups per molecule, the relative proportions by weight of components (a) and (b) being within the range 12:1 to 1:12, drying the coating on the film and depositing a layer of metal on the coated surface of the film by a vacuum evaporation technique.

7. A process according to claim 6 in which the resin coating on the film surface is dried at a temperature of from 60 to 120° C.

References Cited

UNITED STATES PATENTS

| 3,454,533 | 7/1969 | Kerrigan et al. | 117—161 KP X |
| 3,414,430 | 12/1968 | Maho | 117—71 R X |
| 3,023,126 | 2/1962 | Underwood et al. | 117—76 F |
| 2,993,806 | 7/1961 | Fisher et al. | 117—71 R |
| 3,201,271 | 8/1965 | Simmons, Jr. et al. | 117—71 R X |
| 3,219,471 | 11/1965 | Chilton et al. | 117—71 R X |
| 3,267,007 | 8/1966 | Sloan | 117—71 R X |
| 3,393,982 | 7/1968 | Fisher et al. | 117—71 R X |
| 3,552,996 | 1/1971 | Cass | 117—71 R |
| 3,043,728 | 7/1962 | Stauffer | 117—71 R X |

FOREIGN PATENTS

| 800,093 | 8/1958 | Great Britain | 117—71 R |

ALFRED L. LEAVITT, Primary Examiner
J. R. BATTEN, JR., Assistant Examiner

U.S. Cl. X.R.

117—76 F, 107, 138.8 F, 161 KP; 260—75 NP, 77.5 NC, 858, 859